M. M. G. MALCOR.
APPARATUS FOR DIGGING THE GROUND.
APPLICATION FILED JUNE 20, 1912.
1,171,798.
Patented Feb. 15, 1916.
2 SHEETS—SHEET 1.
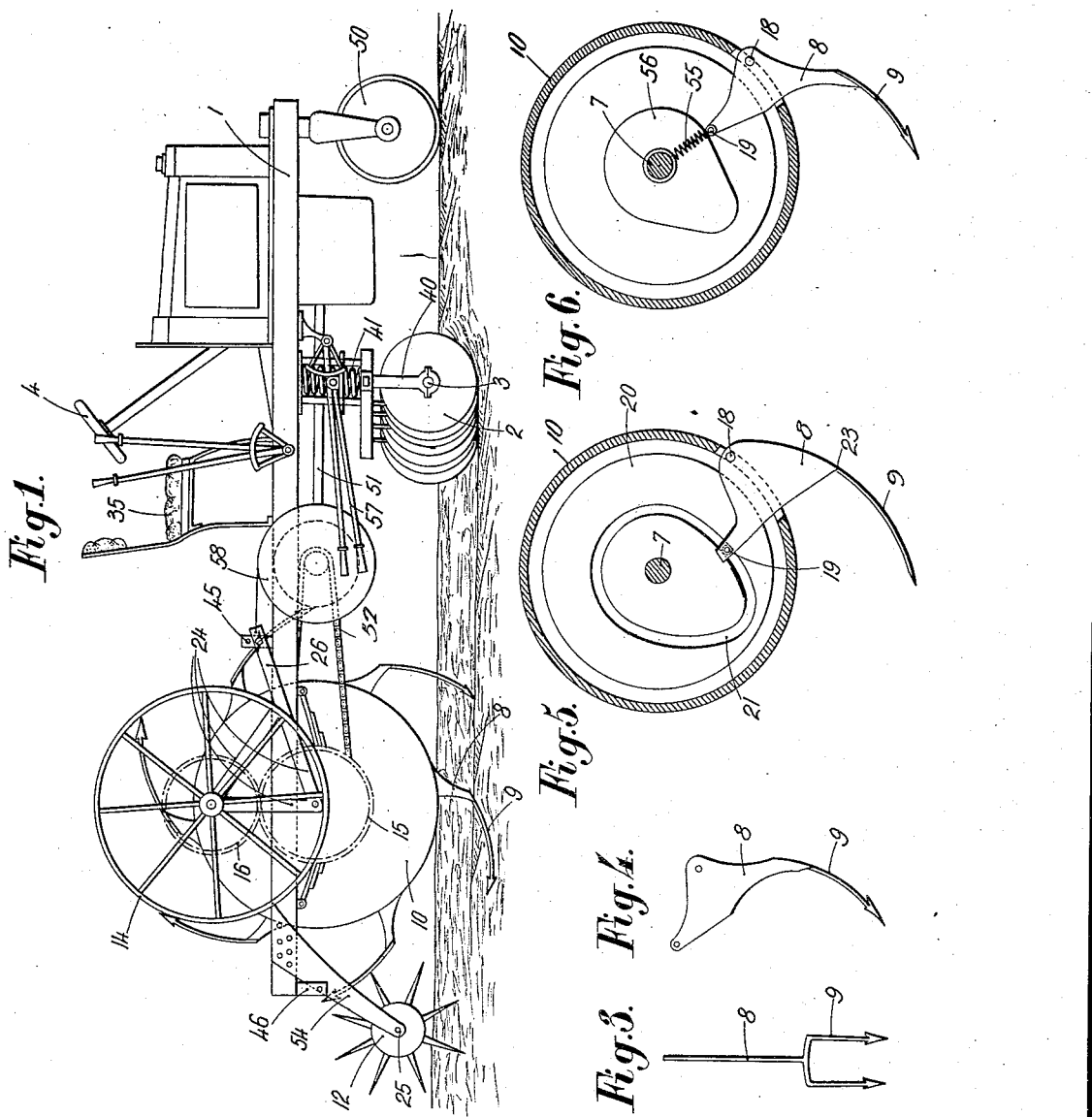

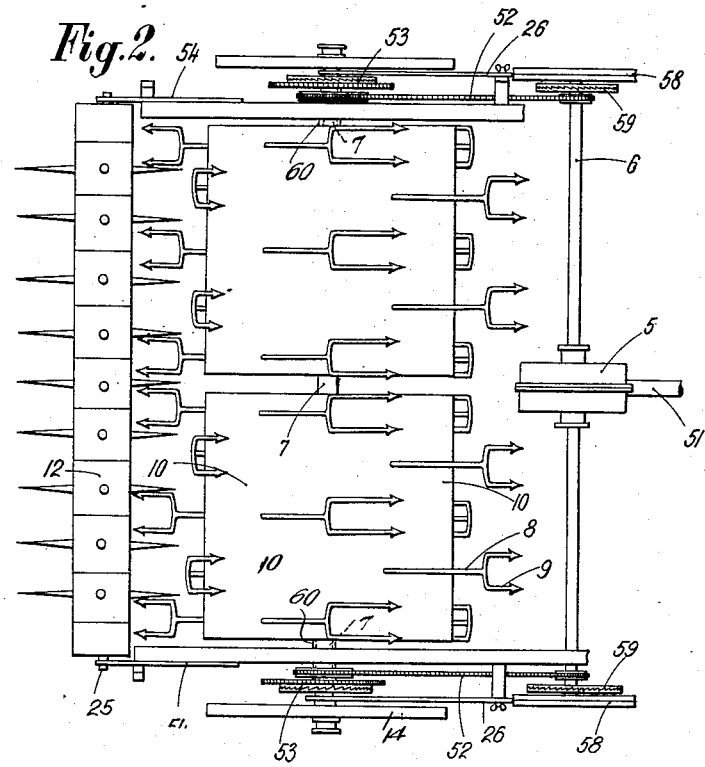
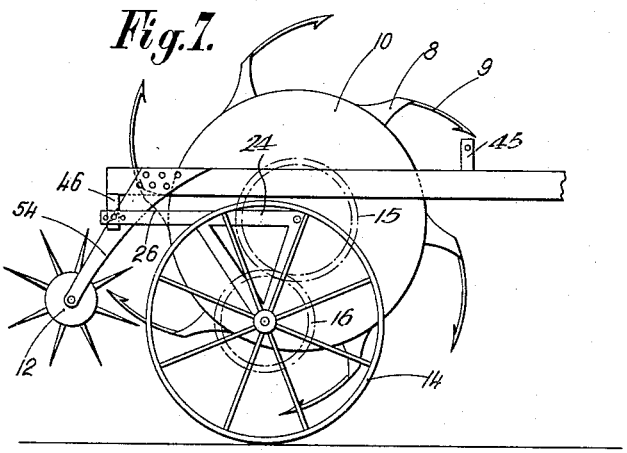

UNITED STATES PATENT OFFICE.

MARCEL MARIE GEORGES MALCOR, OF L'ARIANA, TUNIS.

APPARATUS FOR DIGGING THE GROUND.

1,171,798.  Specification of Letters Patent.  Patented Feb. 15, 1916.

Application filed June 20, 1912. Serial No. 704,862.

*To all whom it may concern:*

Be it known that I, MARCEL MARIE GEORGES MALCOR, citizen of the French Republic, residing at L'Ariana, Tunis, have invented certain new and useful Improvements in Apparatus for Digging the Ground; and I do hereby declare the following to be a full, clear, and exact description of the invention, such as will enable others skilled in the art to which it appertains to make and use the same.

This invention has for its object an apparatus for working the ground, especially for digging. By means of this apparatus, the ground is first pulverized superficially, then a lower layer is dug up and turned over in such a way as to reverse the order of these layers, finally it is harrowed and the surface leveled.

In this apparatus, the elements for working the ground can be at the same time, the elements of support, propulsion and direction. The weight of the whole of the machine is thus one of the working factors, and the power of the driving motor can be employed almost directly for the working of the ground.

This machine consists of a fore-part which reduces the top layer of the ground to dust, and a rear part having specially constructed blades, which penetrate the ground without compressing it, dig and turn over the lower layer of the ground thus realizing an inversion of the two layers. The upper part of the ground is finally raked by suitable mechanism fixed to the rear of the frame which at the same time rids the blades of lumps of soil that have been brought up to the surface in their ascending movement.

In the accompanying drawings: Figure 1 is an elevation of the entire machine, Fig. 2 is a plan view, Figs. 3 and 4 are two elevations of a blade, Figs. 5 and 6 show the ways of fixing the blades, Fig. 7 shows the position the parts are made to assume when it is desired to propel the machine without working the ground.

The machine consists of a frame 1, the fore-part having one or two front wheels 50 fixed thereto, which the driver sitting on a seat 35 can turn by means of a steering wheel 4. At the back of the front wheels a harrow is placed comprising several disks 2 fixed on two shafts 3 only one of which shows in Fig. 1. These two shafts form a very wide V and freely turn in bearings carried by the stanchions 40 whereon the frame rests through springs 41. A lever 57 lowers and raises at will the shafts 3 carrying the harrowing disks 2.

The motor actuates through a shaft 51 and differential gear 5, two shafts 6 which in turn operate through chains 52 and clutches 53, two cylinders 10 mounted on a fixed axle 7. The cylinders 10 are rotatably mounted on the axle 7 and are rotated by means of sleeves 60 secured thereto, which sleeves fixedly carry one part of the clutch 53, while the other part is loosely mounted thereon in a well known manner. On the cylinders 10, a certain number of blades 8 and 9 are mounted. Every one of these blades (Figs. 3 and 4) comprises a web 8 perpendicular to the axle 7 of the cylinder, the length of which corresponds to the thickness of the layers of soil worked by the harrowing disks, and a fork 9, the prongs of which are preferably curved in the direction of rotation of the cylinders 10.

At the rear portion of the machine are fixed two brackets in which a shaft 25 is mounted carrying a plurality of loosely mounted collars or drums 12. The collars 12 are provided with earth working spikes as shown in the drawings to break up the lumps and harrow the spaded ground.

Around axle 7, two triangular frames 24 are mounted to swing, carrying two wheels 14. These wheels actuated through chains 52 and pinions 15 and 16, are used for the transport of the machine.

The frame 24 can occupy two positions. In the position shown in Fig. 1, in which the arms 26 attached to the frame 24 are joined to a support 45 fixed to the frame 1, the wheels 14 are lifted off the ground. In the position shown in Fig. 7, which is obtained by fixing the arms 26 to a support 46 on the frame, the cylinders 10 are lifted and the wheels 14 rest on the ground.

For traveling, the clutches 53 are out so as to leave the cylinders 10 out of gear.

The arms 26 have connected thereto a cable which is wound upon suitable drums 58 actuated from the shaft 6 through the intermediary of a clutch 59. When it is desired to raise the traction wheels 14 from the ground and render the machine operative for earth working purposes, the drums 58 are rotated to wind up the cables, thereby swinging the frame 24 around its axis and raising the wheel 14 to the position shown in Fig. 1.

After the frame 24 has been raised, the clutches 53 which may be friction clutches, if desired are put in, either by hand or automatically by a connection between the cable drums and the clutch lever.

The machine operates in the following manner: The disks 2 in the fore-part of the machine being slantwise in respect to the direction of motion, the ground is worked on the surface and forms a worked layer in a very divided state. The blades 8 and 9 of the cylinders 10, next penetrate the aforesaid layer. The fork 9 enters the part which has not been worked and the shape of this fork has been chosen, so that, all the points on one prong have the same trajectory. Under these circumstances, this fork 9 divides the ground but does not exert any compression, such that the penetration requires a very small effort. While the fork 9 penetrates the ground which has not been worked, the web 8 displaces itself in its own plane in the worked layer and finds an equally small resistance. The motion continuing, each blade or group of blades will bring up in its ascending direction by its prongs, a lump of soil; the cavity thus caused will be filled immediately by the mellowed soil on the surface. After the blade has left the ground, the lump carried by that blade will fall back over both sides of web 8. Each lump will thus be turned over and cut in two and the two layers of soil will have changed places. The spiked wheel 12 effects the separation of lumps on the blades 8, 9 and at the same time does a sort of harrowing.

To prevent the pressure exerted by the cylinder on the ground from impeding the propulsion and the division of lumps done by each blade in its descending motion, the blades, instead of being fixed rigidly, could be made movable in respect to the cylinders and so avoid any compression of the soil between the blades and the cylinders. Fig. 5 shows an arrangement of that kind; the blade is pivoted at 18 on the cylinder 10 by one of its extremities. The other end is fixed so as to move along a certain curve only, a roller or pin 19 sliding in a groove 21 on a disk 20 keyed on the fixed axle 7. In this way, the blade will penetrate the soil without compressing it. Until the moment the center of pressure of the prongs of the fork 9 is below the line of contact of the cylinder 10, every point of the blade will follow the same path, dividing the soil, but not compressing it. When the line of contact is sufficiently in front of the center of pressure of fork 9, the blade 8 and 9 resumes its motion and detaches the lump of soil above it without having to overcome any pressure from the cylinder. The soil is, therefore, not permitted to be compressed between the blades and the cylinder, as this would result in a loss of energy.

The arrangement shown in Fig. 5 can be replaced by any other equivalent, a cam 56 can be fixed on axle 7 having the same outline as groove 21, the blade 8 pivoted in 18 is supported by spring 55 to make contact with cam 56. This arrangement shows an advantage in giving a certain elasticity due to spring 55, which avoids shocks and risks of breaking.

I claim:

1. In an earth-working machine, the combination of means associated with one portion of the machine to work the surface of the soil and leave the worked soil in a loose layer, and spading means associated with the machine and located at the rear of said first-named means to spade the soil lying beneath the loose layer and deposit it on the surface thereof.

2. In an earth-working machine, the combination of means associated with one portion of the machine to work the surface of the soil to form a loose layer thereof, and a plurality of spades arranged in a rotary series and located at the rear of said first-named means to enter the unworked soil lying directly beneath the loose layer, raise the same and then deposit it on the surface of the loose layer.

3. In an earth-working machine, the combination of means associated with one part of the machine to work the surface of the soil to form a loose layer thereof, and spading means associated with the machine and located at the rear of the first-named means to work an adjacent lower layer of the soil and deposit it on the surface of the soil worked by said first-named means, said spading means comprising a plurality of spades arranged to rotate in a circular series, substantially as described.

In testimony whereof I affix my signature, in presence of two witnesses.

MARCEL MARIE GEORGES MALCOR.

Witnesses:
 DEAN B. MASON,
 RENÉ L. J. BOISSON.

Copies of this patent may be obtained for five cents each, by addressing the "Commissioner of Patents, Washington, D. C."